United States Patent [19]

Reich

[11] 4,264,923
[45] Apr. 28, 1981

[54] AUTO TELEVISION THEATER

[76] Inventor: Helmut Reich, Holtum-Geest No. 7, 2816 Kirchlinteln, Fed. Rep. of Germany

[21] Appl. No.: 942,613

[22] Filed: Sep. 15, 1978

[30] Foreign Application Priority Data

Aug. 9, 1978 [DE] Fed. Rep. of Germany ........ 2834929

[51] Int. Cl.³ .............................................. H04N 7/18
[52] U.S. Cl. ........................................ 358/86; 358/93
[58] Field of Search ................ D25/3; 358/83, 93, 86; 353/94; 52/6, 27, 79.1, 169.3, 174; 179/1 AT, 1 DD; 325/308

[56] References Cited

U.S. PATENT DOCUMENTS

| | | | |
|---|---|---|---|
| 2,202,390 | 5/1940 | Linsell | 358/247 |
| 2,529,425 | 11/1950 | Sharp | 179/1 DD |
| 2,574,949 | 11/1951 | Beitman et al. | 52/6 |
| 2,706,930 | 4/1955 | Jansen | 358/250 |
| 2,734,420 | 2/1956 | Smith | 353/94 |
| 2,849,534 | 8/1958 | Doyle | 179/1 DD |
| 3,291,904 | 12/1966 | Ratliff, Jr. | 358/88 |
| 3,421,290 | 1/1969 | Cheney et al. | 52/6 |
| 3,596,018 | 7/1971 | Elmes | 179/1 DD |
| 3,641,727 | 2/1972 | Hill | 52/174 |
| 3,751,670 | 5/1971 | Grodner | 358/86 |
| 3,968,327 | 7/1976 | Gregg | 358/86 |
| 4,074,322 | 2/1978 | Cammilleri | 358/237 |
| 4,135,202 | 1/1979 | Cutler | 325/308 |

FOREIGN PATENT DOCUMENTS

| | | | |
|---|---|---|---|
| 1234784 | 8/1967 | Fed. Rep. of Germany | 358/86 |
| 1176371 | 1/1970 | United Kingdom | 358/93 |

OTHER PUBLICATIONS

Ashton-The Use of CCTV in Anatomical Teaching-The Royal Television Society Journal, vol. 12, #8, Winter 1969, pp. 182–188.

*Primary Examiner*—Joseph A. Orsino, Jr.
*Attorney, Agent, or Firm*—Andrus, Sceales, Starke & Sawall

[57] ABSTRACT

An auto theater has a plurality of video reproductions and playback devices. The video reproduction devices are situated in a central location, while the playback devices are arranged in garage-like boxes which partially or entirely surround the associated vehicle. The reproducing and playback devices are connected through video channels. The auto theater renders possible optimum space utilization, avoids undesired effects on the environment and provides a wide choice of programs and starting times.

21 Claims, 6 Drawing Figures

AUTO TELEVISION THEATER

BACKGROUND OF THE INVENTION

1. Field of the Invention

The invention relates to an auto theatre, that is, a "drive-in-film theatre", which is customarily attended by the patrons in automobiles, but is also attended with other vehicles (motorcycles, bicycles) and even on foot.

2. Description of the Prior Art

With present auto theatres in general, a very large projection screen is provided, in front of which the motor vehicles park in a somewhat circle-sector formed area, so that the vehicle passengers can view the film projected on the screen. Such an auto theatre represents a considerable burden on the environment. The giant projection screen is perceived as an impairment to the landscape. Further, traffic engineering difficulties result: one is the visibility of the projection screen from the street which is dangerous to traffic, another arises in that the beginning and the ending of a performance at a large auto theatre (for example, with 600 vehicle places) often results in a traffic jam. It has thus arisen that is always difficult to obtain a construction permit for an auto theatre.

In the U.S. Pat. No. 2,734,420 an auto theatre is already known, in which a large number of small, circularly divided projection screens are so arranged that the likewise circularly arranged vehicles, respectively approach their own projection screen. The projection screens obtain their film pictures from a projection device centrally arranged in the circle, whose light rays are deflected on the individual projection screens over a reflection system. Because of the absence of a very large projection screen, environmental and traffic problems involved with such a projection screen are certainly avoided or decreased. The circularly formed arrangement of the projection screens and therewith the parked vehicles incurs however a very awkward space utilization and the optical transmission of the film picture over a complicated reflection system may only permit a insufficient picture quality. The traffic engineering problems, which appear through the simultaneous entering and leaving of the vehicles with the performance beginning and ending, are accordingly, as before, unsolved. With these auto theatres, as also with the conventional auto theatre the patron has the choice of only one program.

SUMMARY OF THE INVENTION

The invention has as its object to provide an auto theatre without a large projection screen which nevertheless renders possible optimal space utilization.

Proceeding from an auto theatre with a central information reproducing device and with a plurality of respective vehicle arranged information display devices (as known from U.S. Pat. No. 2,734,420), this object is attained, according to the invention, in that as information reproducing units and playback units, video reproduction and playback devices are provided and that the video playback devices are arranged in or on garage-like boxes partially or entirely surrounding the associated vehicle and the view reproduction apparatus is arranged in a building separate therefrom, whereby the video reproducing apparatus is connected with each of the video playback apparatuses through at least one video channel.

The building containing the video reproduction apparatus can be arranged at an arbitrary spatial distance from the boxes accommodating the vehicles. The boxes themselves can thus be provided in arbitrary geometrical arrangement, which renders possible an optimal space utilization. In particular, the layout of the auto theatre can be adapted to an arbitrary spatial reality.

For all that, only a small influence on the environment is asserted and, certainly to landscape viewing, because the absence of an extremely large projection screen and to traffic engineering insofar as the picture is not visible to anyone outside of the box (so no deflection of the traffic flow on the bordering streets). This is also of advantage in aesthetic-moral aspects, somewhat in regard to films forbidden to children.

As a matter of fact, that the video playback devices, as well as the vehicles, are placed in the garage-like box, serves numerous further advantages. In particular there results from this full independence from the ambient brightness, time of day, and the weather (wetness) which can raise considerably the economical circumstances of the auto theatre. There also results no "bell ringing" as with existing auto theatres with open loudspeakers posts, in that on the one hand the sound of the box is damped and on the other hand the loudspeakers in uncovered boxes can be automatically disconnected. Further, no loudspeaker and/or heating apparatus need be accommodated in the interior of the automobiles so that one escapes the cable connections to the interior of the vehicle and the thereby attendant danger.

Advantageously the video playback devices comprise television and/or video projectors. The video reproduction apparatus can be formed out of a variety of video tape apparatuses or video disc apparatuses or film scanners (telecine) equipment, which is connected with each video playback device through a corresponding number of video channels. This permits a plurality of films, for example, 8-10 films, to be offered, so that the patron has a free choice of program. Advantageously the plurality of films are shown at times staggered with respect to each other. The beginning time of the (same or differing) films can thus be so staggered that, for example, every 5 or 10 minutes a new film begins. In this way it is possible, to prevent peak loads for the feeding street network. The result for the patron is wait free with no associated starting time. Because of the "box system" the auto theatre is also suitable for patrons on foot.

According to the invention there is further the possibility of a personnel saving, fully automatic total operation of the auto theatre, as through coinslots in the boxes.

Further advantageous developments of the invention are given in the subsidiary claims.

BRIEF DESCRIPTION OF THE DRAWINGS

With the drawings a preferred exemplary embodiment of the invention is further explained. The drawings show.

DETAILED DESCRIPTION OF THE PREFERRED EMBODIMENT

Figure 1:
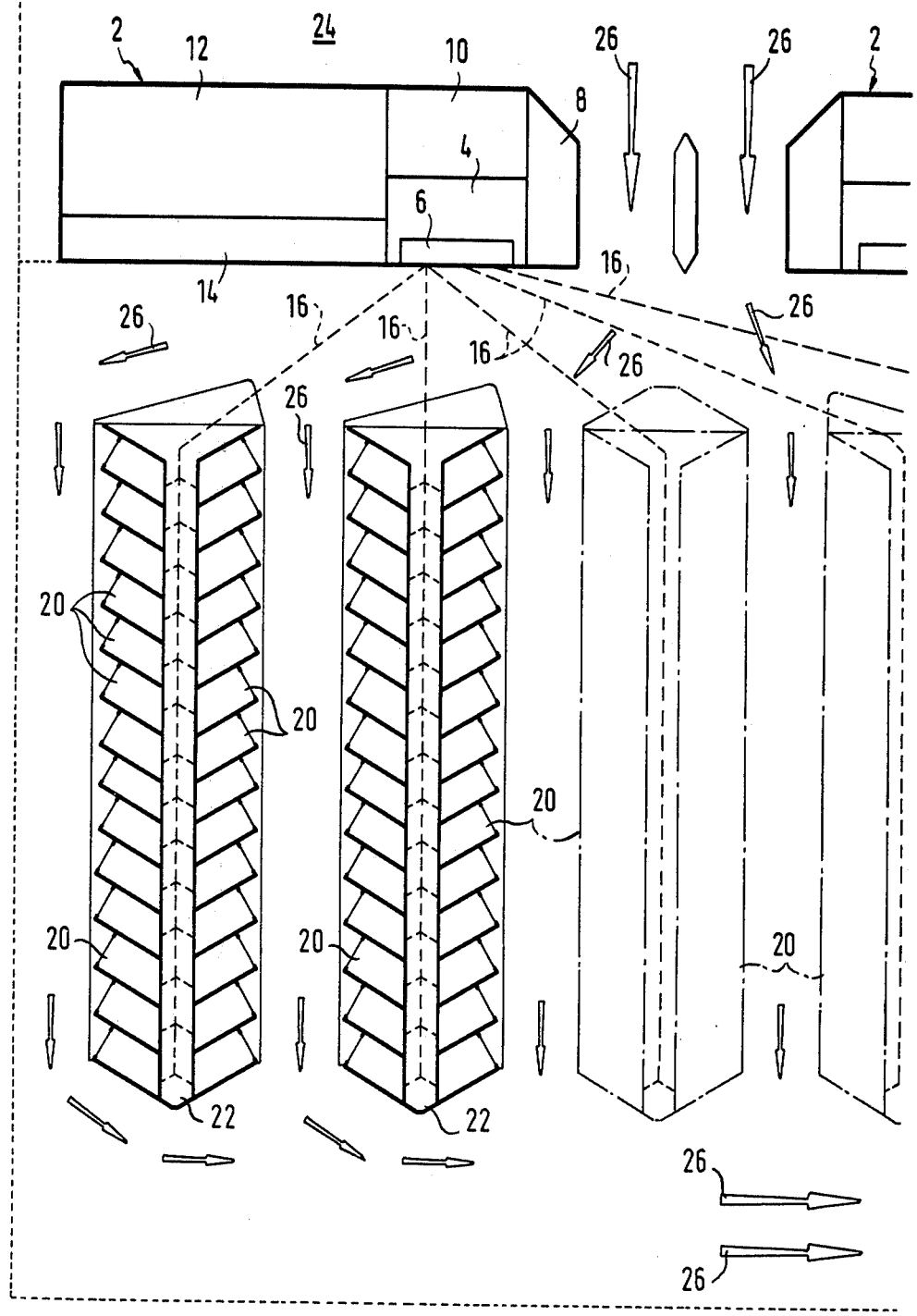
FIG. 1 is a schematic plan view of an auto theatre according to the present invention.

As FIG. 1 shows, the auto theatre shown there is provided with a building 2, which contains a technical centre in the form of a reproducing room 4. In reproducing room 4 is found a (schematically indicated) video reproducing device 6. The building 2 further contains, in the exemplary embodiment, a cashier's booth 8, a work room 10, a restaurant 12, and toilets 14.

Figure 2:
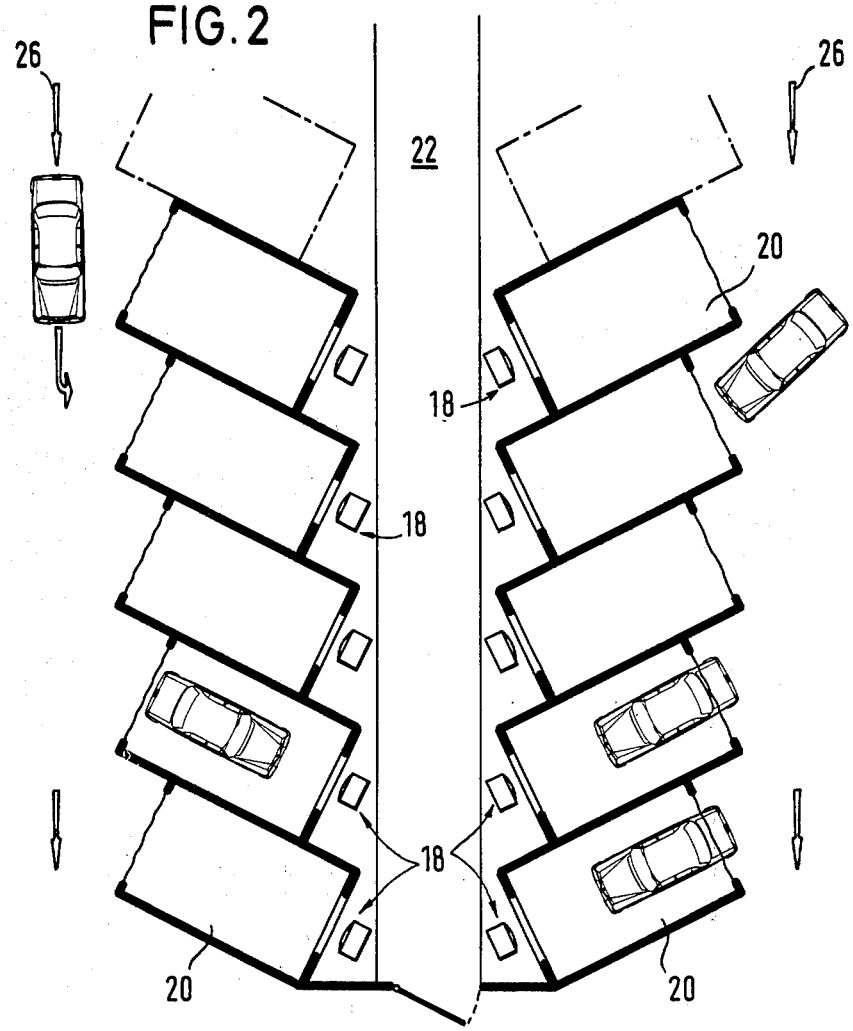
FIG. 2 is an enlarged plan view of a part of the auto theatre according to FIG. 1 illustrating the rows of boxes.
Figure 3:
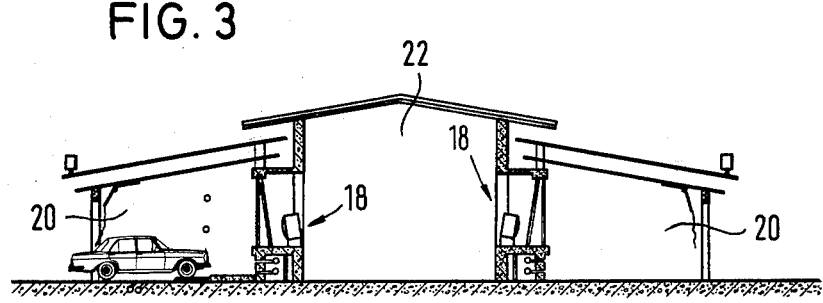
FIG. 3 is a cross-section through the rows of boxes of FIG. 2.

The video reproducing device 6 is formed of a number of video tape apparatuses or video disc apparatuses or film scanning apparatuses (not shown), which are connected by video channels 16 with individual video playback or display devices 18, (as shown more clearly in FIGS. 2 and 3). Preferably conductor cables serve as video channels 16; however electromagnetic waves or modulated (visible or non-visible) light can also be used. The video playback devices 18 are arranged respectively on a front face of garage-like boxes 20 which serve to accommodate a motor vehicle.

The boxes 20 are arranged in parallel rows, whereby the respective boxes of each row are arranged in immediate side adjacency. The garages of two rows are so arranged with respect to each other that they lie in a mirrored image symmetrical to a middle walk way 22 (FIGS. 2, 3). The boxes 20 are so arranged to the middle walk way 22, that the video playback devices 18 are accessible from the middle passageway for repair and maintenance purposes. Further, the boxes 20 are arranged obliquely lying relative to the middle walk way 22, in order to facilitate the entry and exit of the vehicles in boxes 20.

On the side of building 2 turned away from boxes 20 is provided a reservoir space, which can accommodate the waiting motor vehicles in case of particular congestion. The traffic flow in the auto theatre is shown by means of the arrow 26.

Figure 4:
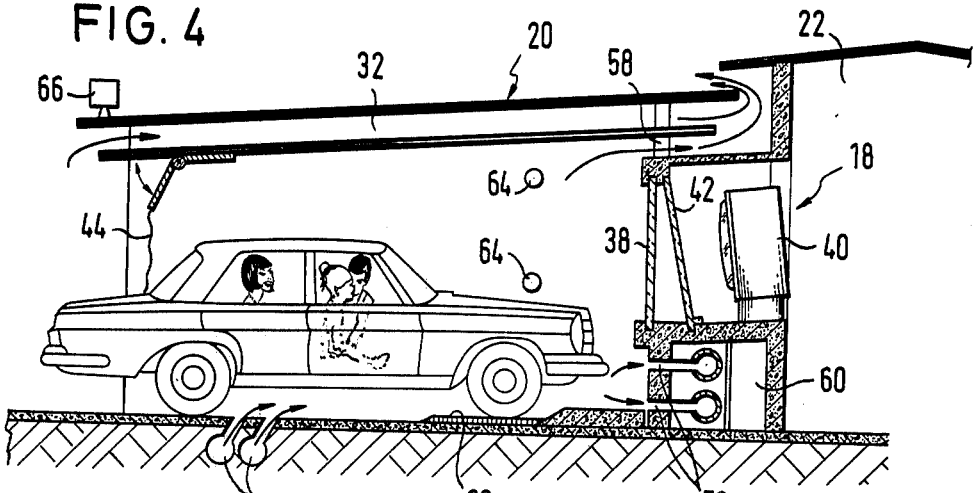
FIG. 4 is a longitudinal section through a single box in an enlarged representation.
Figure 5:
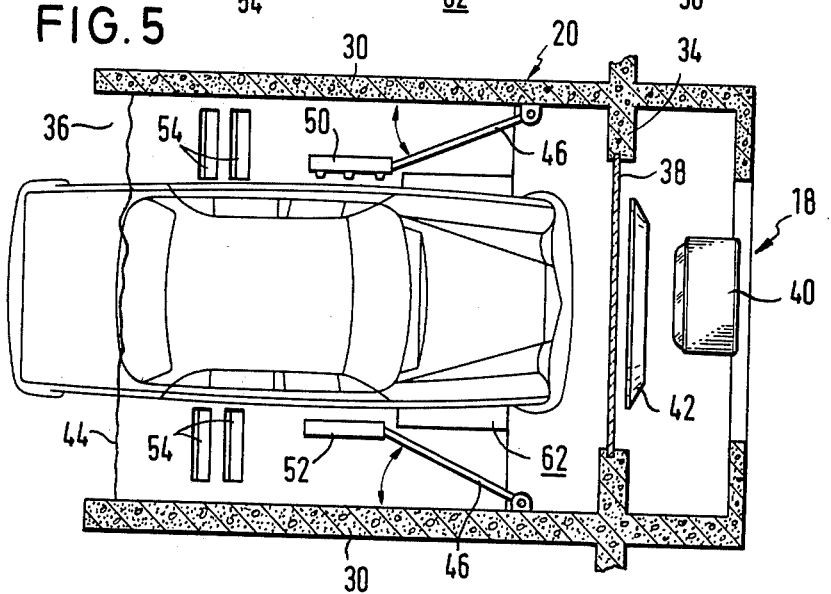
FIG. 5 is a partially cut-away plan view of the box according to FIG. 4.
Figure 6:
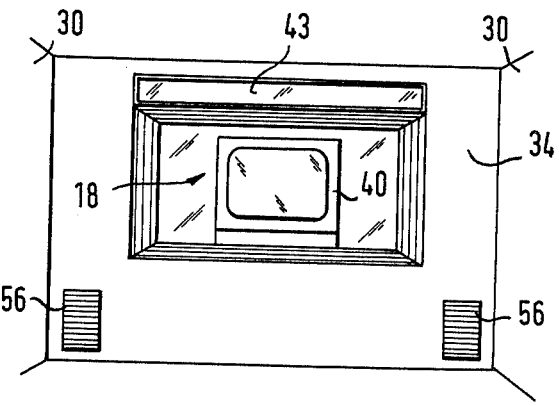
FIG. 6 is a view of the front wall of the box according to FIGS. 4–5.

The development of a box 20 is more precisely shown in FIGS. 4 through 6. Each box includes two sidewalls 30, a covering 32, a front face arranged with the video playback device 18 and a side 36 serving for the entry and exit. The sidewalls 30, the covering 32 and a part of side 34 can be formed from concrete. The side 34 is formed as a wall, which has a rectangular opening (FIG. 6). The opening is closed by a transparent glass in the form of a tempered glass sheet so that the interior of the box 20 is separated from the video playback device 18, however, the later is accessible to the view of the patron. The video playback device 18 is formed of a television apparatus 40 and a magnifying plate in the form of a fresnel lens 42 arranged in front of the screen of television set 40. The fresnel lens stands on a raised pedestal. The fresnel lens 42 serves to magnify the picture produced from the television set 40 in order to convey to the viewer the impression of a projection screen. Above the plate glass sheet 38 is located an illuminated information panel 43 (FIG. 6) containing the conditions of use and service information.

The side 36 is completely or partially closed by a drape 44. The drape 44 is arranged, in such area, that it lies, in the lowered condition, on the rear of the motor vehicle located in box 20, so that the exhaust occurs in the open air. The drape is formed, for example, of a stiff section and a flexible section, so that the drape, through pivoting of the stiff section, can be lowered and raised.

On each sidewall 30, an arm 46 in the form of a pivoted arm is journalled, of which the left hand side arm (in the direction of viewing) carries a loudspeaker and a service desk 50 and the other arm only a loudspeaker 52. The arms 46 are pivoted at a position on the sidewall 30 lying side adjacent to the side windows of the motor vehicle, in order to facilitate the service and reduce the necessary loudness of the sound playback. It will be understood that the loudspeaker (and, if necessary a service desk) can also be mounted directly on the sidewall, so that in this case no arm is necessary.

For the air conditioning and ventilating of each box 20, supply openings 54 for the supply of fresh and warm air are provided on the floor of the box; further exhaust openings 56 are located in the pedestal beneath the video display device 18, which are connected with a blower (not shown) in a central air handling apparatus. Further, the sides 34 above the plate glass are provided with exhaust openings 58.

In the pedestal beneath the video playback device 18 are provided further a cable chute 60 which serves for the receipt of the cable conductors 16.

Each box 20 is provided with a feeler device 62 which responds to the presence of the forward wheels of the vehicle and produces a control signal. In the exemplary embodiment of the invention shown, the feeler device 62 is formed as a contact feeler, which responds to the pressure of the front wheels of the vehicle; the feeler device can however also register the presence of the motor vehicle through sensing a capacitance or a metal mass or be formed as a light barrier. There can further be provided an accoustical sensor (not shown) which produces a control signal in dependence on the motor noise. These control signals can be coupled and therethrough be used to automatically effect the operation of drape 44, the lighting of information tablet 43, the pivoting of arms 46 and/or the coordination of the fresh and warm air supply.

On the sidewalls 30 gas sensors 64 are arranged at different heights, which with the exceeding of permissible exhaust gas concentrations, trips an alarm both in building 2 as well as on the information tablet 43 and also raises the drape 44.

The cover 32 is formed out of two plates held spaced from each other through stilts so that outer air insulating the heating or chilling can circulate in the intermediate space between the two plates. Here could, if necessary, a water sprinkler apparatus (not shown) be provided for fire production. On roof 32 a control light 66 in the form of lightable number shield is provided, which likewise in dependence on the control signal produced through sensor 62 is switched on and serves for outside control.

The operation of the above described auto theatre follows extensively from the above explanation. A vehicle drives in a free box 20 (with raised drape 44) and places the forward wheels in the region of sensor 62 so that a control signal is produced. The engine is turned off so that a second control signal is produced. The conjunctive appearance of the pair of control signals initiates the following operation: (time delayed) the lowering of drape 44, the pivoting out of arms 46, lighting of the information tablet 43, switching of the fresh air and warm air supply to "intensive level", turning off of the control light 66. With the aid of the service desk 50, that stands in connection with the reproducing room 4 in building 2, the program can then be selected and the fresh air, or warm air supply be adjusted. Further, the service desk 50 permits a service call to building 2. Finally, the curtain 44 can with the service desk 50 be selectively actuated.

The drape 44 serves not only as heat insulation, but also as a light protection so that the auto theatre can be used at any time of day and with any weather. The drape 44 can end on the upper side of the rear of the vehicle; it can, however, also extend on both sides of the auto to the ground, in order to obtain a possible extensive sealing.

Preferably a plurality of films, for example, eight to ten films, are displayed, so that the patron can select a film desired by him. The films are staggered time wise to each other so that in a relative short interval the respective performance begins. Herethrough are the unavoidable peak loads for the feeding road network occurring with existing auto theatres avoided.

With the restarting of the motor, the drape 44 is raised, the arms 46 are pivoted back, and the program (in case not otherwise to the end) is ended. The vehicle leaves the box 20, the information tablet 43 is switched off and the control light 66 switched on. The fresh air and warm air supply is switched off or throttled.

I claim:

1. An auto theatre comprising:
   means (6) providing a plurality of video program signals at staggered starting times located at a predetermined location within said auto theatre;
   a plurality of garage-like structures (20) arranged in a predetermined pattern in proximity to said video program signal means, said structures being so constructed as to substantially surround a vehicle in the structure on the front and each side thereof;
   a video program playback means (18) arranged in each of said garage-like structures so as to be viewable by the occupants of the vehicle;
   video program signal transmitting means (16) interconnecting said video program signal means and said video program playback means; and
   selection means in said structures and operable by the occupants of the vehicle for selecting the desired program signal.

2. The auto theatre according to claim 1 wherein said auto theatre includes a plurality of video program signal means connected to said video program playback means through said video program signal transmitting means.

3. The auto theatre according to claim 1 wherein said video program signal means comprises at least one of video tape apparatus, video disc apparatus, and film scanning apparatus.

4. The auto theatre according to claim 1 wherein said video program transmitting means comprises cables interconnecting said video program signal means and each of said video program playback means.

5. The auto theatre according to claim 1 wherein said video program transmitting means comprises electromagnetic wave transmitting and receiving means interconnecting said video program signal means and each of said video program playback means.

6. The auto theatre according to claim 1 characterized in that inside the structure, at least one gas sensor (64) is arranged for providing a signal when an impermissible motor exhaust gas concentration is exceeded.

7. The auto theatre according to claim 1 characterized in that the structures are arranged in immediate side adjacency in rows, whereby the respective structures (20) of two rows are arranged oppositely lying to each other in mirror symmetry to a middle passage (22) serving for maintenance and repair purposes.

8. The auto theatre according to claim 1 characterized in that above each video program playback means (18) an illuminatable information tablet (43) is arranged.

9. An auto theatre according to claim 1 characterized in that in the inside of structure (20) is provided at least one arm (46), which is adjustable to a side window of the vehicle and carries at least one of a service desk (50) and loudspeaker (52).

10. An auto theatre according to claim 1 characterized in that each structure (20) is provided with an air device (54, 56) connected in a central air apparatus for the provision of at least one of fresh air and warm air and for the removal of exhaust air.

11. The auto theatre according to claim 1 wherein said auto theatre has a storage area (24) for receiving the auto theatre attending vehicles.

12. The auto theatre according to claim 1 characterized in that said video program playback means (18) comprise at least one of television sets (40), monitors, and video projectors.

13. The auto theatre according to claim 12 characterized in that magnifiers (42) are placed in front of the video playback means.

14. The auto theatre according to claim 13 wherein said magnifiers comprise fresnel lens.

15. The auto theatre according to claim 1 characterized in that each structure (20) has two rigid side walls (30) and a rigid upper covering (32) and that a front wall (34) is provided with a transparent sheet (38), beyond which the associated video program playback means (18) is located.

16. The auto theatre according to claim 15 characterized in that the covering (32) is formed out of two plates spacedly arranged with each other for thermal insulation.

17. The auto theatre according to claim 1 characterized in that the wall (36) lying opposite to the video program playback means (18), serving for the entrance and exit of the vehicle, is at least partially closed through a raisable drape (44) for light and warmth protection.

18. An auto theatre according to claim 17 characterized in that the drape (44) is so constructed as to be lowerable in the region of the vehicle rear such that the vehicle exhaust remains in the open.

19. The auto theatre according to one of claims 8, 9, 10, 17, 18, or 10 including a sensing apparatus (62), responsive to the presence of a vehicle in said garage-like structure.

20. The auto theatre according to claim 19 characterized in that the sensing apparatus establishes the presence of a vehicle through a light barrier.

21. The auto theatre according to claim 19 characterized in that the sensing apparatus establishes the presence of a vehicle through at least one of the sensing of a pressure, a capacitance, and an iron mass.

* * * * *